US006715585B1

(12) United States Patent
Overbaugh

(10) Patent No.: US 6,715,585 B1
(45) Date of Patent: Apr. 6, 2004

(54) TREE STAND

(76) Inventor: Anthony D. Overbaugh, 140 Theodore Dr., Winchester, VA (US) 22602

( * ) Notice: Subject to any disclaimer, the term of this patent is extended or adjusted under 35 U.S.C. 154(b) by 0 days.

(21) Appl. No.: 09/949,643

(22) Filed: Sep. 12, 2001

Related U.S. Application Data

(63) Continuation-in-part of application No. 09/595,892, filed on Jun. 20, 2000, now abandoned.

(51) Int. Cl.[7] .............................................. A63B 27/00
(52) U.S. Cl. ...................... 182/187; 182/133; 182/136; 182/188
(58) Field of Search ................................. 182/135, 136, 182/187, 188, 120, 122; 108/154; 24/129 A

(56) References Cited

U.S. PATENT DOCUMENTS

| | | | |
|---|---|---|---|
| 1,158,173 A | | 10/1915 | Carpentier |
| 3,871,482 A | | 3/1975 | Southard |
| 4,113,057 A | * | 9/1978 | Bessinger .................... 182/187 |
| 4,120,379 A | | 10/1978 | Carter |
| 4,316,526 A | | 2/1982 | Amacker |
| 4,337,844 A | | 7/1982 | Hice, Sr. |
| 4,813,441 A | | 3/1989 | Kepley |
| 4,890,694 A | | 1/1990 | Williams |
| 4,909,353 A | * | 3/1990 | Govin et al. ................. 182/187 |
| 5,086,874 A | | 2/1992 | Treants |
| 5,097,925 A | | 3/1992 | Walker, Jr. |
| 5,101,934 A | | 4/1992 | Zumbro |
| 5,114,113 A | * | 5/1992 | Krinner ....................... 248/525 |
| 5,143,177 A | | 9/1992 | Smith |
| 5,195,216 A | | 3/1993 | Ishii |
| 5,234,076 A | | 8/1993 | Louk et al. |
| 5,311,967 A | | 5/1994 | Kennedy |
| 5,316,105 A | * | 5/1994 | Reggin et al. ............... 182/187 |
| 5,388,664 A | * | 2/1995 | Bator .......................... 182/100 |
| 5,462,135 A | | 10/1995 | Ambler et al. |
| 5,680,910 A | | 10/1997 | Sarphie, IV |
| 5,775,464 A | | 7/1998 | Gardner |
| 5,921,348 A | | 7/1999 | Louk et al. |
| 5,975,242 A | | 11/1999 | Woller et al. |
| 5,979,603 A | * | 11/1999 | Woller ......................... 182/187 |
| 6,182,792 B1 | | 2/2001 | Woller et al. |
| 6,264,000 B1 | * | 7/2001 | Johnson ...................... 182/136 |
| 6,267,202 B1 | * | 7/2001 | Nelson ........................ 182/187 |
| 6,308,800 B1 | * | 10/2001 | Graham, Jr. ................. 182/136 |
| 6,367,585 B1 | * | 4/2002 | Fast ............................ 182/187 |
| 6,386,321 B1 | * | 5/2002 | Muhich ....................... 182/187 |
| 6,397,973 B1 | * | 6/2002 | Woller ......................... 182/187 |

* cited by examiner

*Primary Examiner*—Bruce A. Lev
(74) *Attorney, Agent, or Firm*—Hoffman, Wasson & Gitler

(57) ABSTRACT

A tree stand has a platform and seat portion that are used together. The two portions are very similar and differ in that the platform has a grid on which a hunter can stand, and the seat portion has a sling in which the hunter can sit. Both portions have a frame with an upstanding post. A cable extends from one side of the frame across to the opposite side of the post and circles a tree, crosses the other side of the post and is attached to the opposite side of the frame. This results in a criss-crossed line that both securely attaches each portion to the tree and is easy to set up by a single hunter.

8 Claims, 9 Drawing Sheets

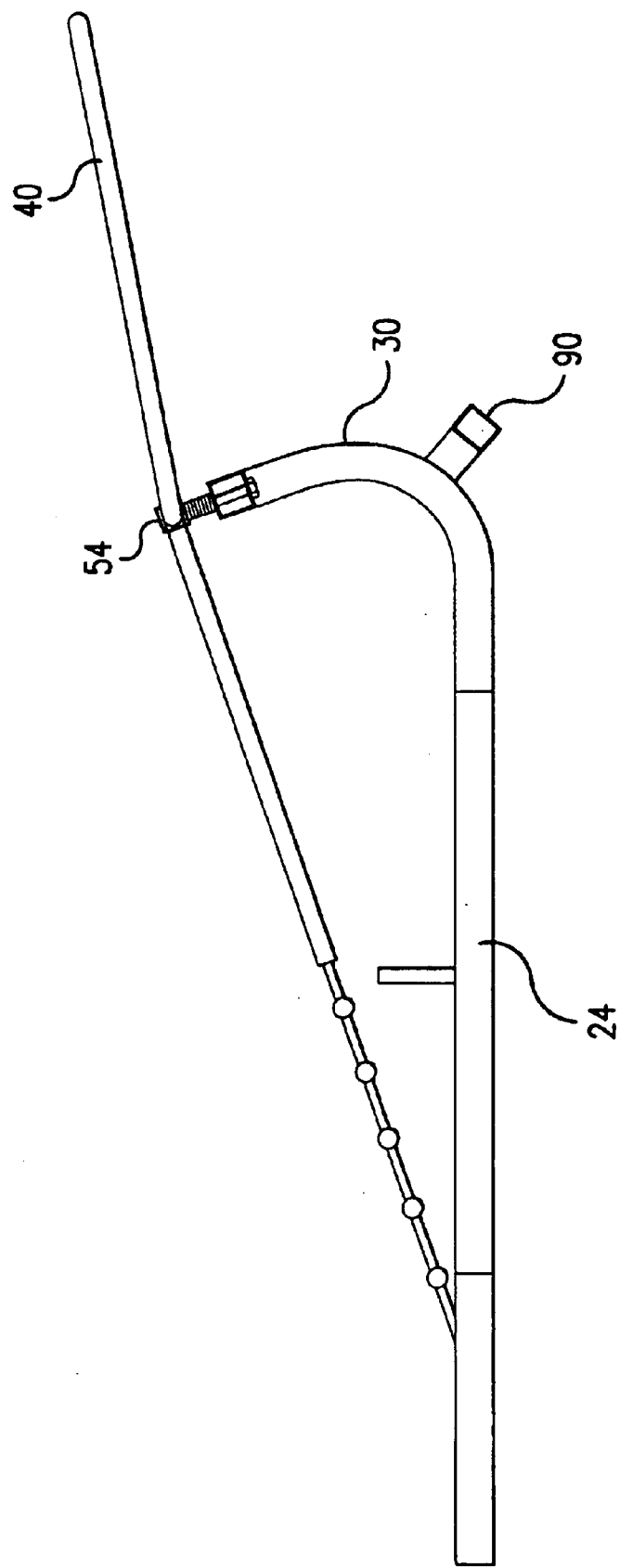

TREE STAND

This application is a continuation-in-part of Ser. No. 09/595,892, filed Jun. 20, 2000, now abandoned.

FIELD OF THE INVENTION

The invention relates to a tree stand, of the type that is used in hunting.

BACKGROUND OF THE INVENTION

Hunters often use tree stands while hunting. Tree stands have a mechanism for attaching themselves to a tree. The tree stand allows the hunter to be in an elevated position, out of the sight of game. Once attached, the hunter can spend long periods of time in a tree stand waiting for game to come to them. Tree stands are often used when bow hunting, as it allows the hunter to remain hidden in the tree so the game can get close enough for a bow to be used accurately.

Tree stands have been known for some time and there are many devices that are exemplary of the prior art. One such device is disclosed in U.S. Pat. No. 4,890,694 (Williams). Williams discloses a tree stand, including a platform 12 and a seat 14 collapsible between a position overlying the platform and a position upstanding from the platform. A climbing band 30 circles the tree, as shown in FIG. 3. A climbing aid 110 is provided for the tree stand. The aid includes a generally rectangular frame with one frame member slidable toward and away from the opposite end frame member to adjustably lock the frame in a selected position, dependent upon the girth of the tree.

Another such known tree stand is disclosed in U.S. Pat. No. 5,101,934 (Sumbro). Sumbro discloses a two-piece tree stand, including a climbing platform 12 and a locking element 60. The two elements interlock to fasten the components to one another and to add stability to the individual elements. The stand has a horizontal portion provided with a notched portion for engaging the tree and a band 32, 35 surrounding the tree.

A tree stand is disclosed by U.S. Pat. No. 5,975,242 (Woller et al) includes a platform 11 and tubular frame members supporting the platform. A yoke 42 is coupled to the platform and engages the tree, and in cable 50 couples the platform to the tree, with the end of the cable carrying a series of nuts 53. Cleats 38 are positioned on the tubular frame members for releasably securing the cable end using the nuts upon the cable.

None of the known devices discloses a tree stand that is lightweight and has a simple, secure manner in which to attach the stand to a tree.

It is therefore an object of the invention to provide a lightweight tree stand.

It is another object of the invention to provide a tree stand that securely attaches to a wider range of trees than prior devices, regardless of girth.

It is yet another object of the invention to provide a tree stand that is easy to set up and comfortable to use for extended periods of time.

These and other objects of the invention will become apparent to one of ordinary skill in the art after considering the disclosure of the invention.

SUMMARY OF THE INVENTION

The tree stand has a platform and seat portion that are used together. The two portions are very similar and differ in that the platform has a grid on which a hunter can stand, and the seat portion has a sling in which the hunter can sit. Both portions have a frame with an upstanding post. A cable extends from one side of the frame across to the opposite side of the post and encircles a tree, crosses the other side of the post and is attached to the opposite side of the frame. This results in a criss-crossed line that both securely attaches each portion to the tree and is easy to set up by a single hunter.

The use of a post that is centrally located relative to the frame provides a guide point for the cable, reduces the overall size, and therefore weight, of the stand. The reduced weight and size allow the hunter to be able to carry the stand for long distances into the woods until a suitable spot is found to set up the stand.

BRIEF DESCRIPTION OF THE DRAWINGS

FIG. 3 is a side view of the device;

DETAILED DESCRIPTION OF THE DRAWINGS

Figure 1:
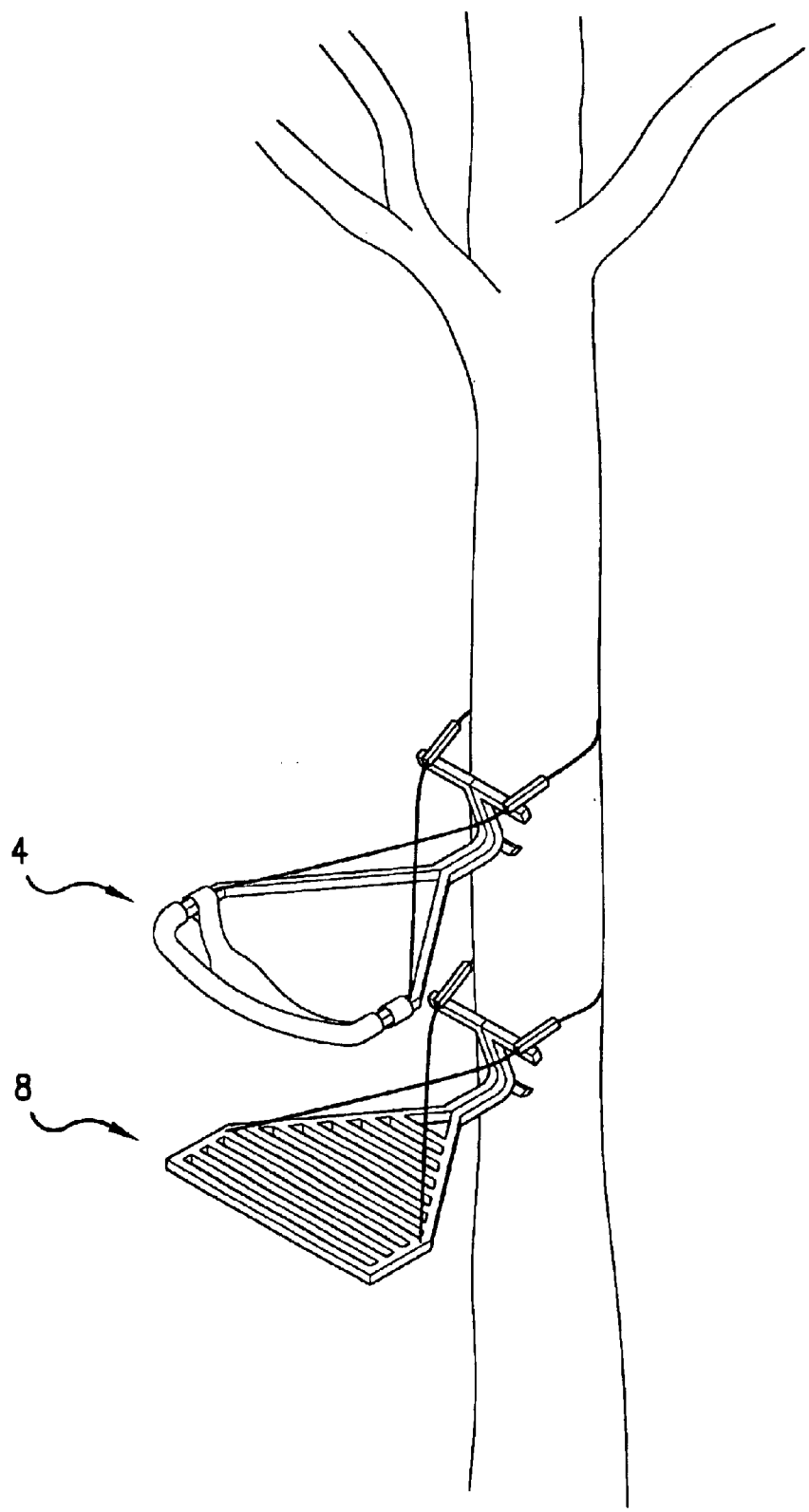
FIG. 1 is a perspective view of the device attached to a tree.

A description of the invention will be made with reference to the drawings. In FIG. 1, the device is seen as it would be used on a tree. The device has a seat portion 4 and a platform portion 8. Both portions would most likely be used together in a manner that will be described later. As can be seen in this figure, the seat portion 4 is located above the platform section 8 and provides a place for the hunter to sit. The platform portion 8 has a grid that provides a place for the hunter to stand. The hunter can assume either a sitting or standing position, as he so desires.

Figure 2A:
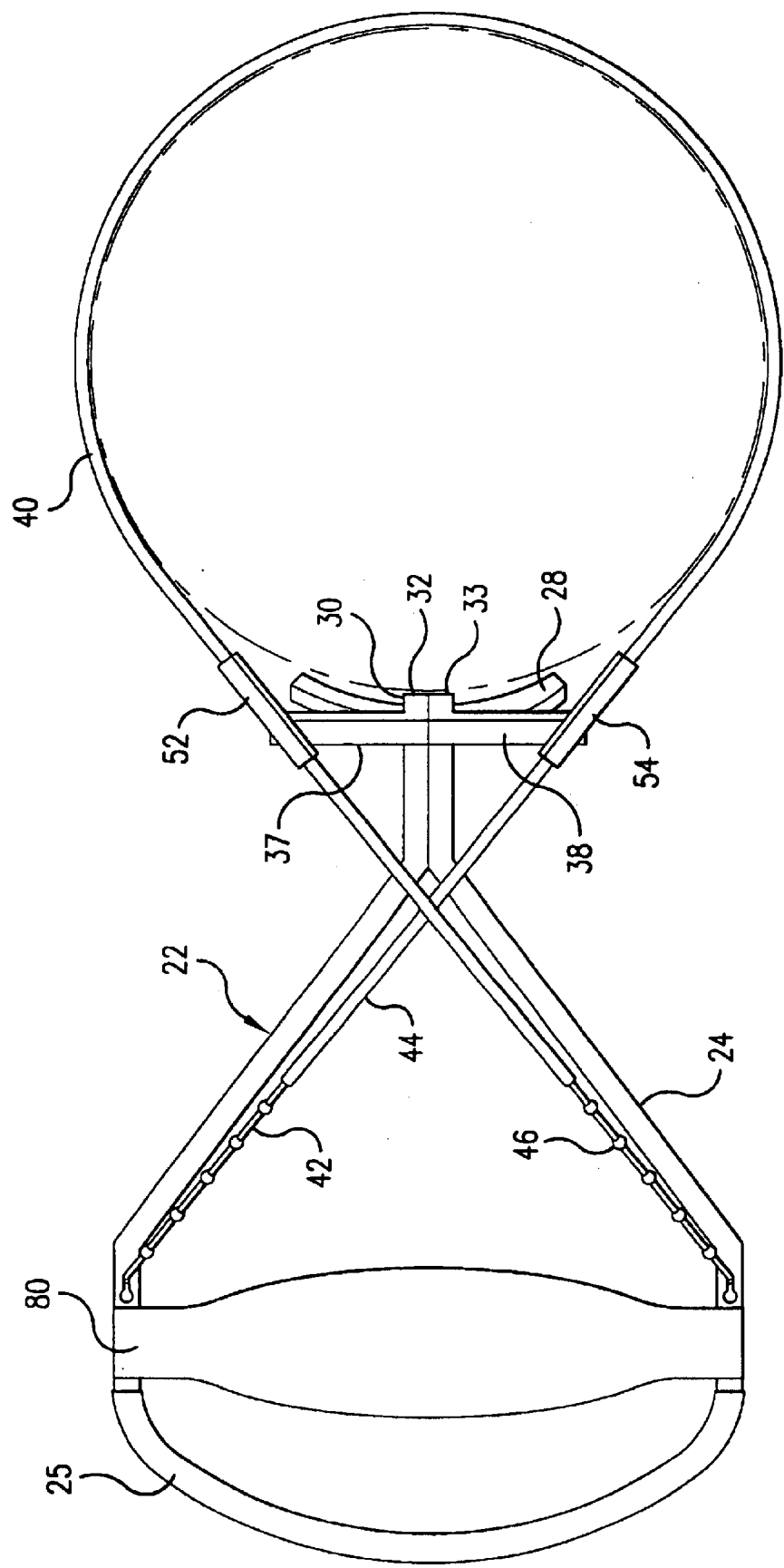
FIG. 2A is a top view of the seat platform attached to a tree.

The details of the construction of the device are seen in FIG. 2A. This view depicts a top view of the seat portion 4 attached to a tree. The seat portion 4 and platform portion 8 have many features in common and the same numerals will be used for corresponding parts. The device has a frame with a left side 22, and right side 24 and an end section 25. The base includes a claw 28 for gripping a tree trunk. The frame is symmetrical and is separated into a left half and a right half by a midline. A post 30 extends upwardly from the end of the frame opposite the end section 25. The left side 22 leads to a right vertically extending section 52, and the right side 24 leads to a left vertically extending section 33. A left horizontal extending section 37 extends from the left vertically extending section 32 and, similarly, a right horizontal extending section 38 extends from the right vertically extending section 33. A left guide tube is connected to the left horizontal section 37 and a right guide tube 54 is connected to the right horizontal section 38. A sling seat 80 extends between the left side 22 and right side 24 of the frame. This sling provides a hunter with a place to sit. The entire frame can be formed by bending a single piece of tubing.

The mechanism for attaching the device to a tree will now be described. A cable 40 is formed by a metal cable 42 held within a plastic tube 44. The metal cable 42 is longer than the plastic tube 44, and the metal cable 42 extends from both ends of the plastic tube 44. The metal cable 42 is provided with protrusions 46. The plastic tube 44 provides a measure of rigidity to the cable 40 to allow the cable 40 to maintain its shape. The metal cable 42, alone, would tend not to support its own weight and not maintain any given shape.

The metal cable is attached to and extends from the frame left side 22 and passes through the right guide tube 54 that is pivotably mounted on the right horizontal extending section 38. The cable 40 extends around the tree to form a loop and extends through left guide tube 52 pivotably mounted on the left horizontal extending section 37. The cable extends to and is attached to the right frame side 24. The metal cable provides a means for adjusting the length of the cable 40 in a manner that will be described later.

Figure 2B:
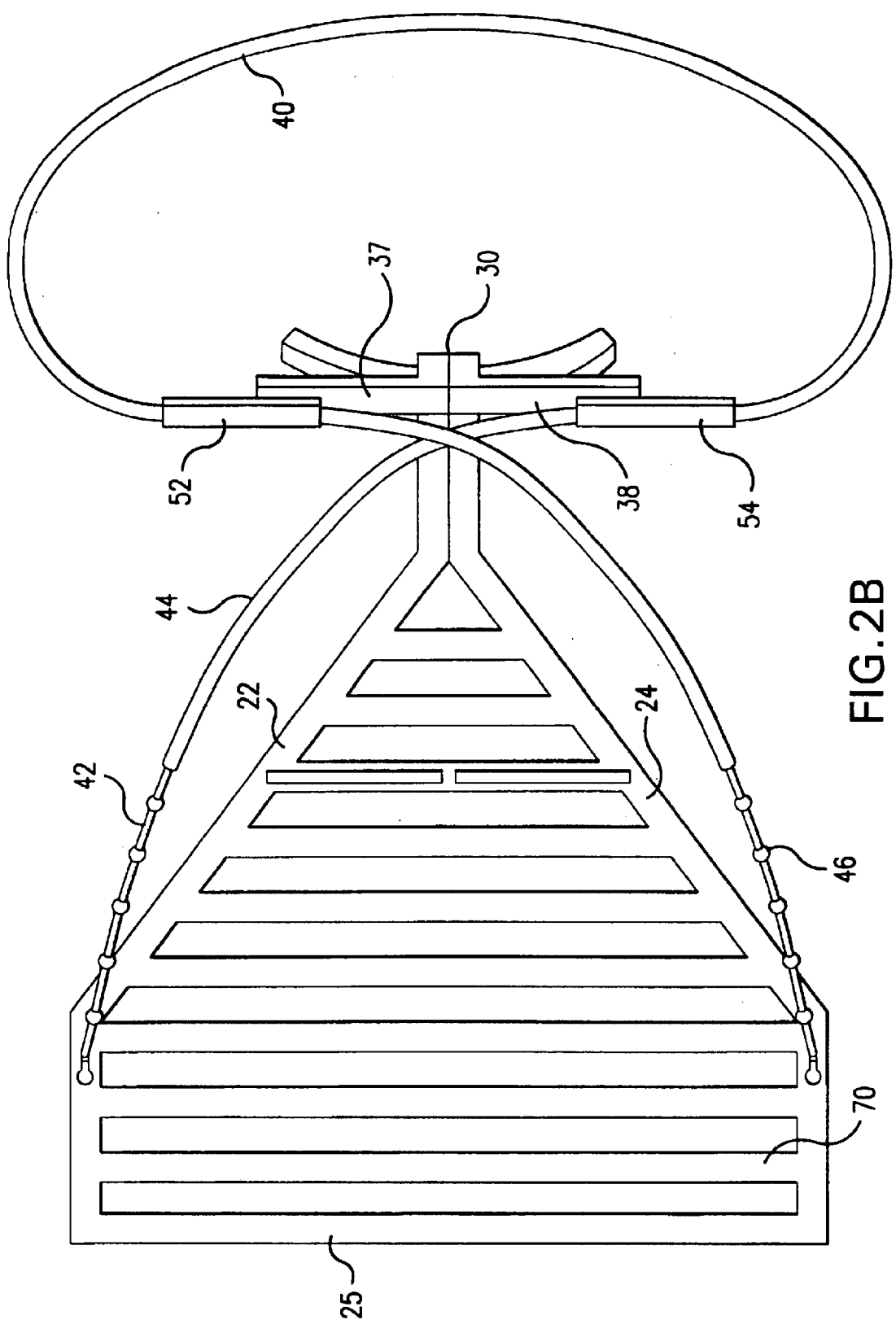
FIG. 2B is a top view of the platform portion not in use.

The device is unattached to a tree is shown in FIG. 2B. This figure depicts a top view of the platform portion 8. In place of the sling seat 80, the platform 8 has a series of bars 70 extending between the left side 22 and right side 24 of the frame to form a grid. The frame can be formed of C-shaped aluminum tubing, with the open end of the C-shaped tubing facing inwardly of the frame. This allows the bars 70 to be easily inserted between the two sides of the frame for easy manufacture of the platform. The bars 70 would have a length greater than the distance between the inside edges of the frame and rest within the channel formed by the C-shaped tubing. Once positioned, they can be easily joined to the frame sides by methods such as welding or any conventional manner. As also seen in this view, when the device is unattached to a tree, the left guide 52 and right guide 54 have pivoted toward a position parallel with the horizontally extending sections of the post 37, 38. This pivoting of the tubes causes the loop formed by the cable 40 to increase in diameter and is used when moving the device up and down a tree.

A side view of the device is seen in FIG. 3. The side view of both the platforms is substantially identical. Seen in this view is the right side of the frame 24 and the vertical extending post 33. Near the juncture of the frame 24 and post 30 is a claw 90. In use, the claw 90 rests against the tree and provides stability for the device. As can be seen in this view, the vertically extending post 30 is bent toward the end section 25 to form an angle with a vertical axis. This is done so that the top of the horizontally extending portion 38 forms an angle with a horizontal plane. When the device with the post and frame is formed from a single piece of aluminum tubing, bending the post 30 to make the angle with the vertical plane and then bending the aluminum tubing outwardly to be perpendicular with the post 30, allows the top surface of the horizontally extending portion 37, 38 to form this angle with the horizontal plane. A pin, such as a bolt, connects the guide tubes 52, 54 with the horizontally extending post sections 37, 38. Due to the angle, the horizontally extending portions 37, 38 make with a horizontal plane, the guide tubes 52, 54 inherit the same angle. This angle helps to maintain the angle the cable makes as it extends upwardly from the frame to the guide tubes 52, 54. The angle of the cable continues through the loop that will encircle the tree and creates a high point of the cable where it is furthest from the frame.

Figure 4:
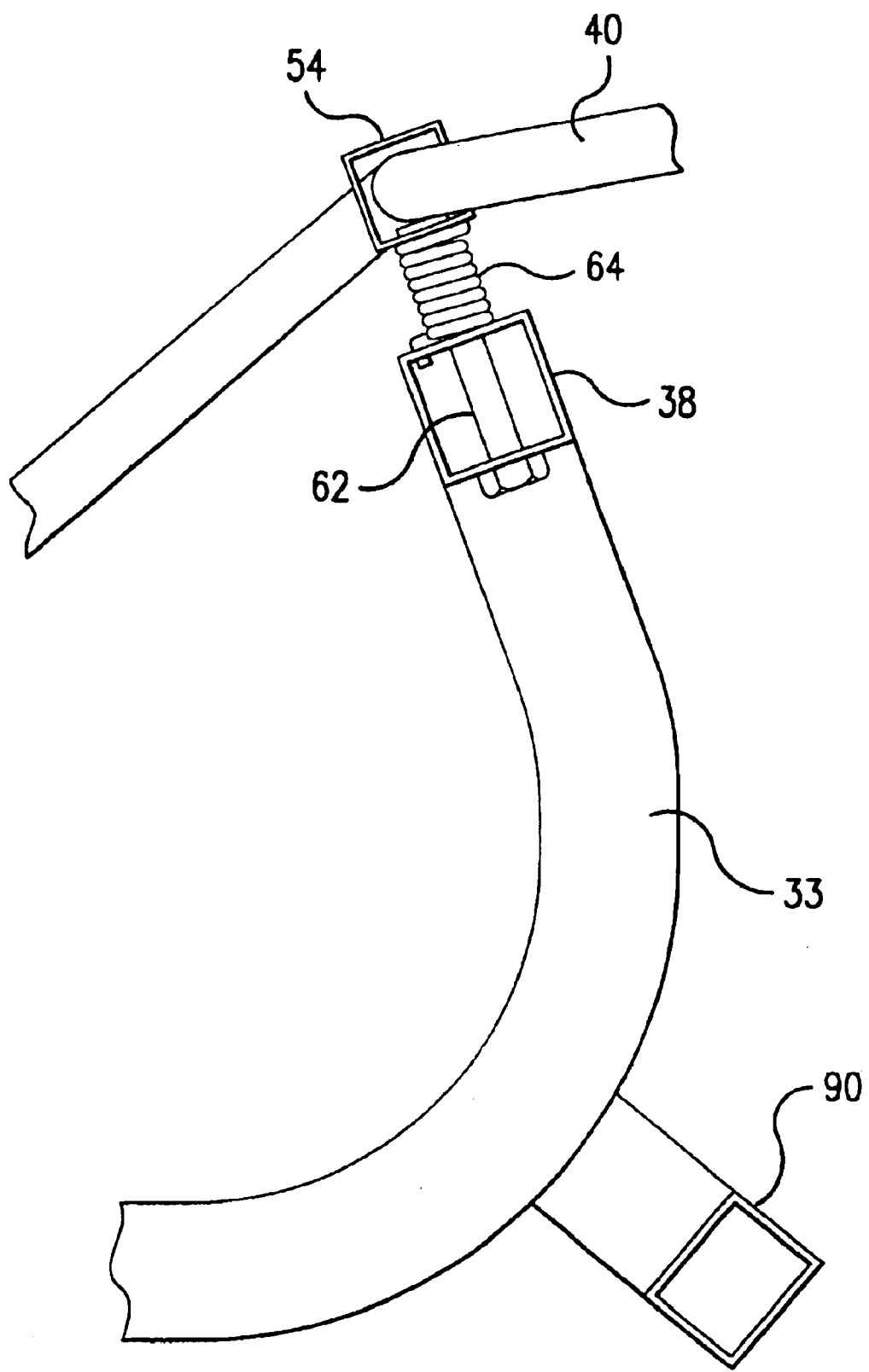
FIG. 4 is a detailed view of the cable guide.

Turning now to FIG. 4, the details of the construction of the guide tube's connection to the post is clearly seen. Since both sides have identical construction, only one will be described. A pin 62 extends through the right horizontally extending portion of the post 38 through the right guide tube 54. A torsional spring 64 is connected to both the right horizontally extending portion 38 and guide tube 54. The torsional spring urges the tube to the unattached position shown in FIG. 2B. Also illustrated in this figure is how the curvature of the vertically extending portion 33 causes the top surface of the horizontally extending portion 38 to form an angle with a horizontal plane and how the connection with the right guide tube 54 causes it to have a similar angle.

Figure 5:
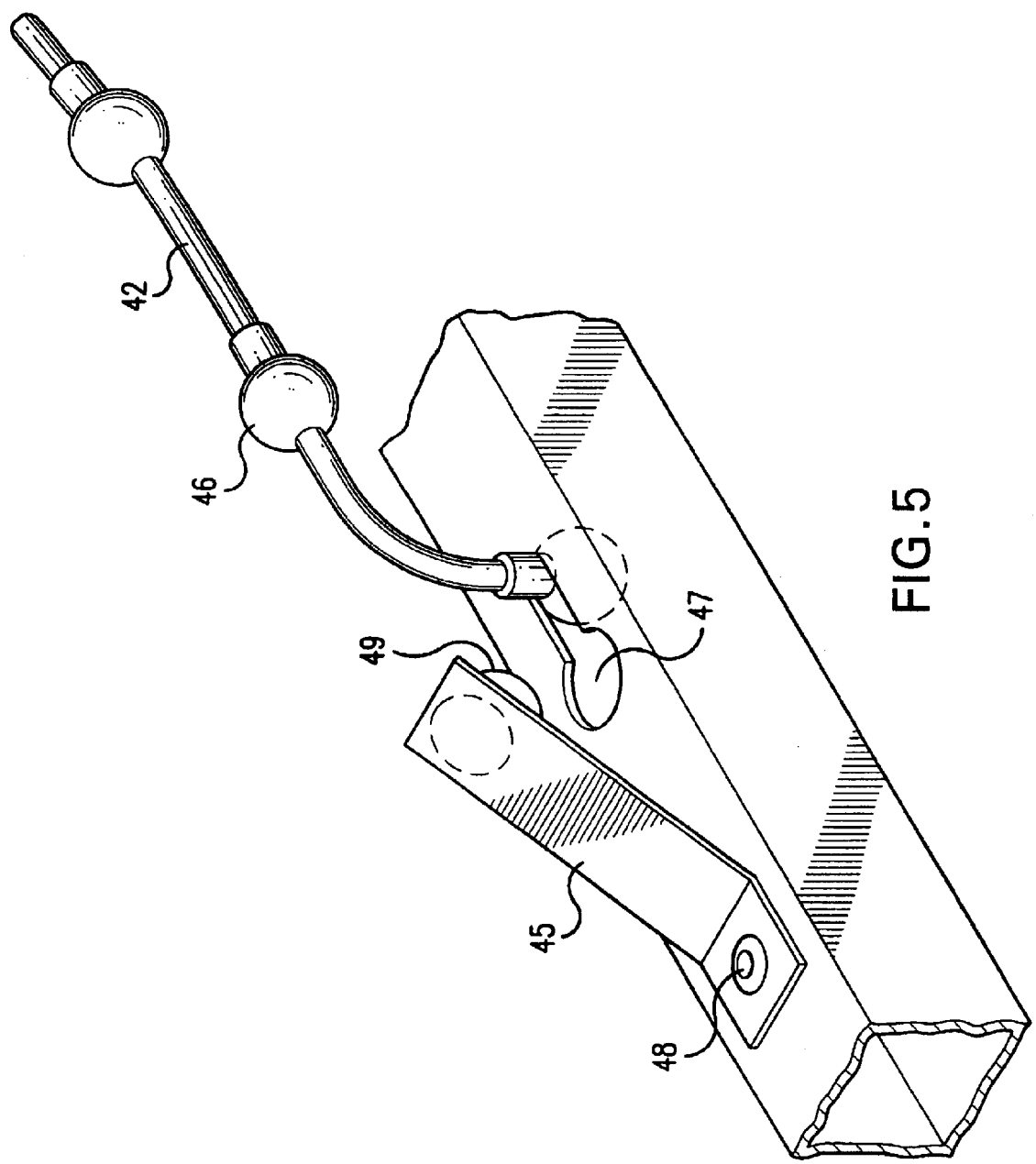
FIG. 5 is a detailed view of the cable adjustment and retention system.

The adjustable cable retention system is illustrated in detail in FIG. 5. As discussed previously, the cable 40 includes a metal cable 42, having protrusions 46. The top surface of the frame right and left side are provided with keyhole apertures 47. The top of the keyhole is large enough to allow the protrusions 46 to pass through. After the protrusion is passed through, the cables move forward to the smaller area of the cable aperture. This area will not allow the protrusions to pass. A similar aperture is provided on the bottom surface of the frame so that any length of cable can be passed through the aperture to achieve the desired length of the cable 40, dependent on the circumference of the tree. A lock can be attached to the length of cable that extends through the frame. Once attached, this lock will prevent the cable from being detached from the frame and prevent removal of the stand from a tree.

For additional safety, a metal flap 45 is attached to the top surface of the frame by rivet 48. The metal piece 45 has a spring action and slides downward. The under surface of the metal piece 45 is provided with a protuberance 49 that fits into the large section of the keyhole aperture 47. After the cable is fully inserted to the desired length, and placed in the smaller portion of the keyhole aperture 47, the metal portion 45 is lowered so that the protuberance 49 is inserted into the larger portion of the keyhole aperture 47. This precludes the cable from ever moving toward the larger section of the keyhole aperture and allowing the cable to work itself loose. While both ends of the cable 42 can be provided with protrusions 46 and keyhole aperture, only one end is necessary. A second end can be permanently attached, as only one end needs to be adjustable to vary the length of the cable.

With the structure of the device having been described, the method of using the tree stand will now be explained. When the hunter reaches a tree that is suitable for his purposes, the seating platform is attached to a tree. One end of the cable is attached to the frame, either permanently or adjustably, and the cable is threaded through the guide tube on the opposite side of the frame, around the tree to make a loop entering the other guide tube and attached to the other side of the frame. The length of the cable is adjusted by pulling the cable through and locking it to the keyhole aperture 47. At this point, the frame will be vertically oriented with the claw resting against the tree. The length of the cable is adjusted so that the platform supports its own weight. Both the seat portion and platform portion are connected to the tree in this manner, with the seat portion being higher.

Each platform is then raised in height along the tree. To raise either platform, the hunter places all his weight on one platform. The other platform is adjusted by raising the front edge 25 of the platform upwardly. This reduces the distance between the attachment point of the cable to the frame and the furthest point of the cable from the attachment point.

This reduction in distance causes the loop around the tree to increase in diameter. With this movement, tension is released from the cable and the guide tube pivots outwardly. In this regard, the left guide tube pivots counterclockwise as seen from above and the right side guide tube pivots clockwise as seen from above. Thus loosened, the platform can be raised. This is done alternatively to both platforms as the hunter placed all the weight on one platform while manipulating the other platform and raising it in height.

With the weight of the hunter placed on the platform he urges the front edge of the platform downwardly. This increases tension on the cable and tightens the loop about the tree. One additional feature which may be added to the invention is a strap that goes about the tree and is placed below the seat platform. The strap can have a hook which attaches to an eyelet on the bottom of the frame near the post. Once the strap is attached to the frame, the strap provides a downward force on the seat portion. This maintains tension on the cable and a secure fit of the seat platform on the tree. The advantage of such a feature is that the hunter can stand on the platform portion 8 and lean from side to side, placing weight against the frame of the seat platform 4 without worrying about the seat platform shifting in position. By doing so, the hunter can peer around the tree safely.

Figure 6:
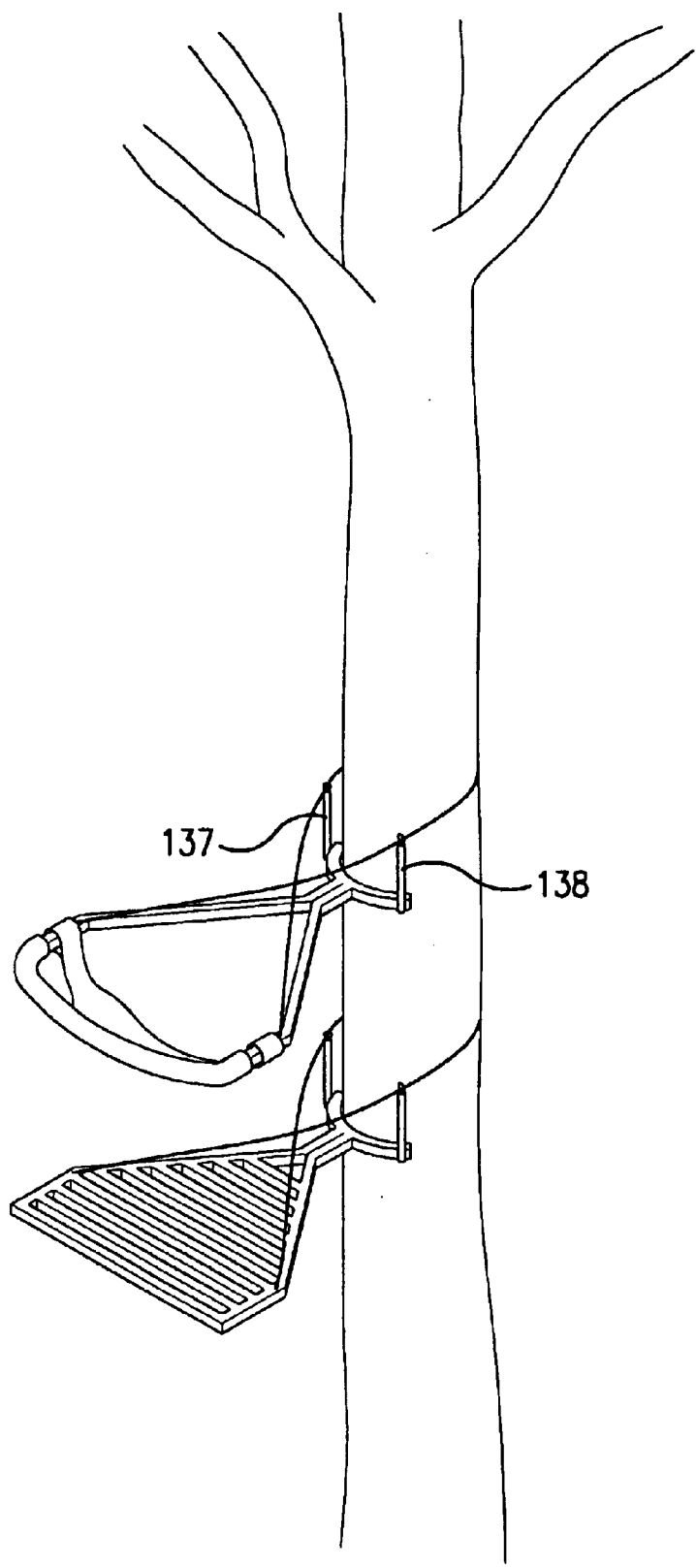
FIG. 6 is a perspective view of an alternative embodiment of the invention.
Figure 7:
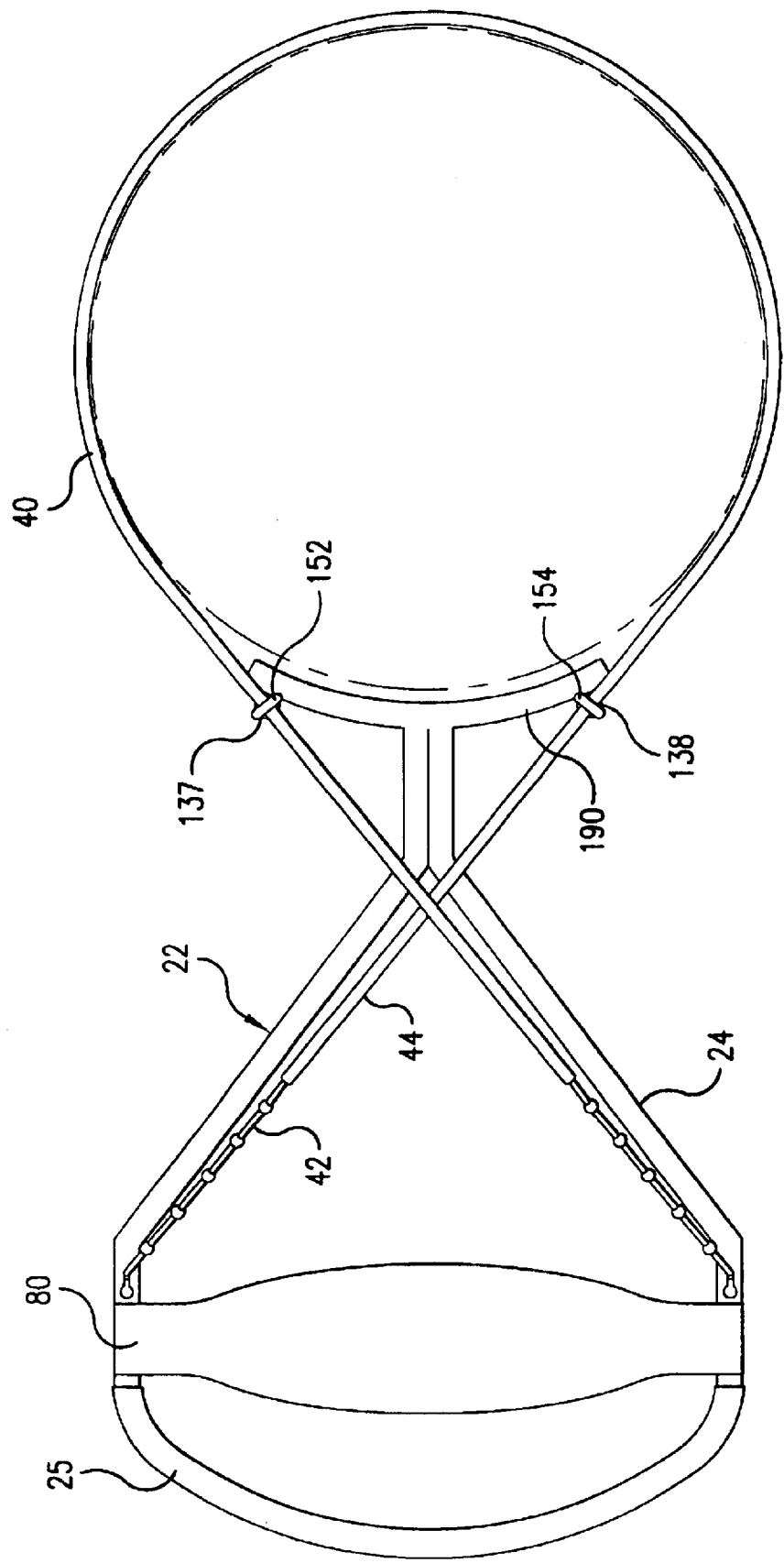
FIG. 7 is a top view of the alternative embodiment of the invention.

FIGS. 6 and 7 shown an alternative embodiment of the invention which will be described. Like reference numerals designate the equivalent structure in the two embodiments. The base has a claw 190 that has a greater radius of curvature than the claw 90 of the first embodiment. At both ends of the claw 190, a left post 137 and right post 138 extend upwardly. Each post is rigidly connected to the claw 190 and is made of flexible material such as fiber glass or carbon fiber material. At the top of each post 137, 138 is a cable guide 152, 154. The cable 40 extends through the guides as it encircles the tree.

Figure 8:
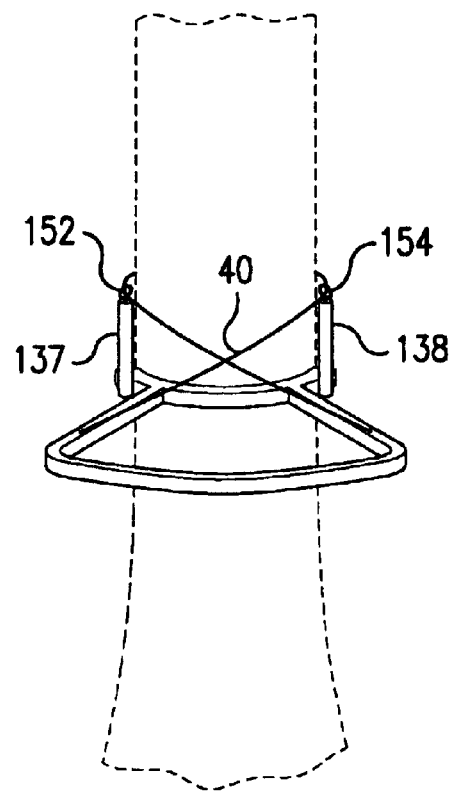
FIG. 8 is a front perspective view of the alternative embodiment.

The flexibility of the posts allow them to flex inwardly and outwardly according to the circumference of the tree. Without any weight applied to the base, the post will open the cable loop to space the cable from the tree, enabling the hunter to climb the tree. When weight is applied to the base, the tension formed in the cable causes the post to flex inwardly as the cable maintains a tight frictional grip about the tree as is shown in FIG. 8. The flexing of the post with the application of weight is akin to the pivoting of the guide tubes 52, 54 in the previous embodiment.

As can be seen in FIG. 8, the frame and claw 190 are formed from two separate U-shaped pieces that are welded together. This is an alternative to the one piece construction shown in FIGS. 6 and 7. In that embodiment, a single piece of tubing is bent into the appropriate shape. The frame can be used to support a grid or sling seat, as shown in FIG. 6.

Figure 9:
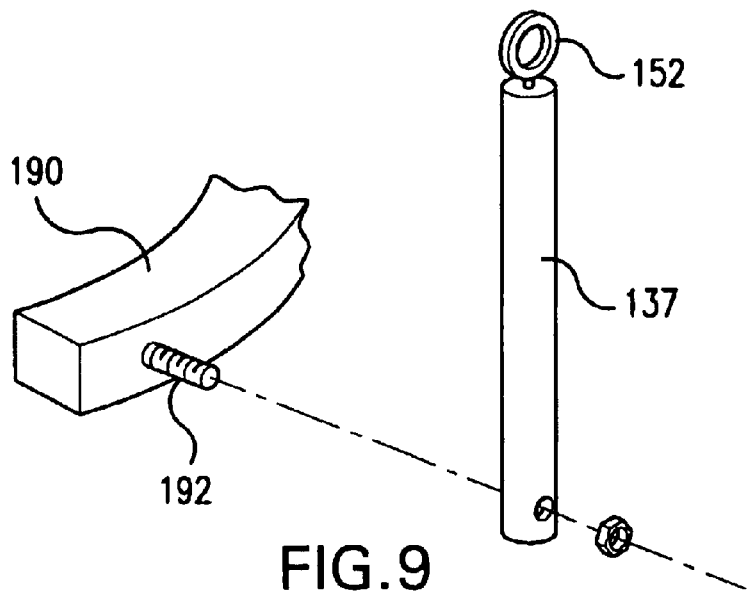
FIG. 9 is a detailed view of the post connection in the alternative embodiment.

FIG. 9 shows the connection of the post 137 to the claw 190. A threaded member 192 extends outwardly from the claw 190, proximate its end. The post is attached to the claw by extending the threaded member 192 through an aperture 138 in the bottom of the post. After the post is attached to the claw, a nut is tightened to rigidly secure the post 137 to the claw 190. For transportation purposes, the nut can be loosened, but not removed and the post pivoted downwardly onto the frame. This results in a lower profile and facilitates transportation of the frame.

While the invention has been described with reference to the preferred embodiment, many variations and modifications to the invention would be obvious to one of skill in the art. Such modifications and variations would be encompassed within the scope of the invention as defined by the appended claims.

I claim:

1. A tree stand comprising:

a base having a right side and a left side and a midline forming a right half and a left half, a cable for securing said base to a tree, a first post extending upwardly from said right side of said base, a first cable guide on said first post for guiding said cable, a second post extending upwardly from said left side of said base a second cable guide on said second post for guiding said cable, wherein said cable is attached to said base left side at a left attachment point, said cable first extending from said left attachment point to said first cable guide, then said cable extending from said first cable guide to said second cable guide, then said cable extending from said second cable guide to a right attachment point on said base right side, said cable crossing itself at an intersection point between the second cable guide and said right attachment point, said intersection point being substantially over said midline.

2. The tree stand of claim 1, wherein said first cable guide is attached to a first post extending upwardly from said base, said second cable guide is attached to a second post extending upwardly from said base.

3. The tree stand of claim 2, wherein said first post and said second post are flexible.

4. The tree stand of claim 3, where said posts are formed from a material chosen from a group including fiberglass and carbon fiber.

5. A tree stand, comprising:

a base for supporting person. said base having a front, a back, a left side, a right side and a midline equally spaced from said left side and said right side, and a continuous cable for attaching said base to a tree, said cable attached to said left side of said base at a left attachment point, said cable first extending from said left attachment point toward said midline, said cable then forming a loop for encircling a tree, said cable crossing itself at a cross-over point for completing the loop, said cross over point located substantially over said midline, said cable then extending from said cross-over point to a right attachment point on said right side for securing said cable to said base right side, wherein said cable forms a loop for encircling a tree, said loop having a first circumference when said cable is not under tension and a second circumference when said cable is under tension, said second circumference being smaller than the first circumference, and means for returning said loop to said first circumference when tension on the cable is released.

6. The tree stand of claim 5, wherein said means for returning said loop to said first circumference comprises a first flexible post attached to said base right side and a second flexible post attached to said base second side, said posts bending inwardly toward said midline when said cable is under tension and returning to their original position when said tension is released.

7. The tree stand of claim 6, wherein each of said posts are attached to said base by a pin, said posts pivotable about said pins between an upright position and a collapsed position wherein said posts lie against said base.

8. The tree stand of claim 5, wherein
said means for returning said loop to said first circumference comprises
- a first post connected to said base, said post having a top surface,
- a first guide pivotally attached to said first post for guiding said cable, said first guide pivoting in a plane substantially parallel to said post top surface, and
- a second post connected to said base, said post having a top surface,
- a second guide pivotally attached to said second post for guiding said cable, said second guide pivoting in a plane substantially parallel to said post top surface, and
- a bias attached to each guide, said bias urging said loop toward said first circumference.

* * * * *